US005915788A

United States Patent [19]

Schneider

[11] Patent Number: 5,915,788

[45] Date of Patent: Jun. 29, 1999

[54] MULTI-FUNCTION CONTROL FOR CHAIR

[75] Inventor: Jean-Marc Schneider, Sarrebourg, France

[73] Assignee: Steelcase Inc., Grand Rapids, Mich.

[21] Appl. No.: 08/838,617

[22] Filed: Apr. 10, 1997

[30] Foreign Application Priority Data

Apr. 22, 1996 [EP] European Pat. Off. .............. 96440031

[51] Int. Cl.[6] ............................... A47C 3/00; G05G 1/10; F16C 1/10

[52] U.S. Cl. ................................. 297/301.3; 297/344.19; 297/303.3; 74/553; 74/500.5; 74/501.5 R; 74/501.6

[58] Field of Search .............................. 297/303.1, 303.4, 297/301.1, 301.3, 301.4, 301.5, 344.12, 344.19, 344.18, 354.12, 303.3, 463.1; 74/553, 500.5, 501.5 R, 501.6

[56] References Cited

U.S. PATENT DOCUMENTS

| | | | |
|---|---|---|---|
| 3,756,654 | 9/1973 | Bauer . | |
| 4,328,943 | 5/1982 | Eldon, III . | |
| 4,373,692 | 2/1983 | Knoblauch et al. . | |
| 4,561,693 | 12/1985 | Brownlie et al. . | |
| 4,595,237 | 6/1986 | Nelsen . | |
| 4,779,925 | 10/1988 | Heinzel . | |
| 4,916,968 | 4/1990 | Kabaya . | |
| 5,222,783 | 6/1993 | Lai | 297/301.4 |
| 5,427,434 | 6/1995 | Hybarger | 297/344.19 |
| 5,577,804 | 11/1996 | Tedesco | 297/344.19 |
| 5,577,807 | 11/1996 | Hodge et al. . | |

*Primary Examiner*—Milton Nelson, Jr.
*Attorney, Agent, or Firm*—Price, Heneveld, Cooper, DeWitt & Litton

[57] ABSTRACT

A chair includes a seat, a base including a housing, and a reclineable back pivoted to the housing. The chair further includes a pneumatic system having a valve actuateable to adjust a height of the seat with respect to the base, a cam for blocking the degree of tilt of one of the back and seat, and a spring for supporting the reclineable back. A multi-function member or "satellite" control is operably mounted to the housing and includes a first spindle translatable for pulling the cable to open and close the valve for adjusting the height of the seat. The first spindle is further rotatable to operate the cam to at least partially immobilize the back. The multi-function member further includes a second spindle including a threaded portion engaging a nut for adjusting the tension of the spring when the second spindle is rotated. The second spindle is rotatably mounted in the first spindle.

16 Claims, 6 Drawing Sheets

MULTI-FUNCTION CONTROL FOR CHAIR

BACKGROUND OF THE INVENTION

This invention relates to improvements in office chairs and more specifically to improvements to adjustment and control systems for the various movable and for shapable parts of an office chair.

It is known to use a pneumatically operated adjustment mechanism in chairs. The adjustment results from telescopic engagement between two portions actuated by a jack. Preferably, the pneumatic system includes a cartridge or "jack" containing a compressed gas feeding two coaxial cylinders embodying the two portions, the control of communication between the cylinders being provided by opening or closing a control valve. Such a system is described, for example, in the French Patent No. 2,025,110.

It is also known to allow a tilting of the back portion upon the seat portion. The tilting is lockable in each of two end positions or in one of a series of intermediate positions.

It is also known to allow an adjustment of the tilting tightness or tension of the chair, i.e. of the seat portion and/or of the back portion. For example, by using a twisting spring wound around the tilting shaft, the adjustment resulting from the twisting torque is applied to the spring. A typical mechanism of this kind makes use of the position of a translating movable element.

All such adjustment and control possibilities offer to the user a maximal comfort whatever his size, his conformation and the conditions of use of the chair. Most of them however have the drawback to be independent and distributed in various locations under the seat, which requires from the user a good deal of trial and error when he wants to select the adjustment he wants to act upon.

There exist indeed already chairs in which some controls are grouped or coupled with a view to be acted upon a reduced member of control members.

For example, each of the document WO 81/03605 and the French Patent No. 2,460,648 disclose an armchair in which the height adjustment of the seat and the tilt adjustment of the back are controlled through an unique rotative member, i.e. a cam, which act, depending upon its angular position, upon one or the other of two valves equipping two pneumatic cylinders controlling the adjustments. This control member being unique, it does not provide the user with a differentiation between said two adjustments.

European Patent No. 0,385,473 discloses a chair having systems for adjusting the height and the tilting tension, the systems being controlled through two distinct organs located at the same place. However, there does not exist means for adjusting the degree of tilt which, if they would be coupled with the adjustment systems, could be actuated at the same place under the seat. European Patent No. 0,592,008, which is a division of the precedent, has the same limitations. In both last documents, the mechanism is extremely complicated.

Reversely, European Patent No. 0,549,026 discloses a chair having a mechanism which can be called "global" but very simple to control at will the seat height and the back tilting. The mechanism comprises an activation lever designed to take different positions in which, through proper linkages, it gives various configurations to the chair elements, somewhat like shifting gears lever. It is therefore not really a control for different adjustments.

It appears therefore that, in the prior art, a number of attempts have been made to allow a seat user to proceed with the various possible adjustments of said seat through organs grouping or coupling several controls together, but that none of such adjustment mechanisms have been designed for the three said adjustments with a differentiation of the adjustment controls.

SUMMARY OF THE INVENTION

This invention has for its object an office chair having adjustment means for adjusting the movable and/or shapable elements it is equipped with, the individual control means for all said adjustment means being grouped at one unique place of said chair into a unique multifunctional organ or "control satellite", said control means being differentiated by the nature of the movement to confer to a given different element of said to actuate each control.

More specifically, the chair according to the invention comprises, together:

1. First means for adjustment of the height of the seat above the fixed pedestal;
2. Second means for adjustment and locking the tilting degree of the seat and/or of the back; and
3. Third means for adjustment of the tension of said tilt.

The control means of the first, second and third adjustment means being grouped in a multi-functional satellite in which, along an axis is longitudinally movable a multi-function member controlling the pull action of means acting for opening and closing the valve of a height adjustment of the seat above the pedestal, along a threaded portion of the axis being mounted a nut which is axially movable under the rotation of the axis, the nut controlling the tension of at least one twisting spring connected to the seat with a view to control the tilt tension of the seat, and round the axis being rotatively mounted an element, the rotation of which controls the actuation of an organ locking the back in one of at least two preselected positions.

Such an arrangement has the advantage to make the use of the control means more "intuitive", inasmuch all the control means are located in one given place but clearly differentiated through the type of movement to perform to act each control means. In addition, due to the conception of such a satellite, the use of the control means is easier, especially for the adjustment of the tilt tension of the seat, which is located laterally along the seat instead of being usually under the seat and which is also more aesthetic, inasmuch to several levers or knobs is substituted only one "control satellite".

Such an arrangement obviously implies a mutual adaptation of the various control means, said adaptation comprising preferentially the three following features:

1. A first control means is actuated by rotation of a first shaft mounted within the satellite;
2. A second control means is actuated by rotation of a second shaft mounted coaxially around said first shaft; and
3. A third control means is actuated by translation of said second shaft along said first shaft.

In the preferential modification referred to above, the seat height being adjustable in a known manner by a pneumatic system comprising a jack, preferably a cartridge of compressed air being connected to two coaxial cylinders through a valve, the communication between the coaxial cylinders to control their mutual axial movement being controlled by opening the valve, such an opening being itself controlled by pulling a cable, the pulling action resulting from the axial translation along the first shaft of an element mounted in the satellite.

The tilt tension of the seat being adjustable in a known manner by a system comprising an helical spring wound around the axis of said tilting movement, the modification of the torque applied to the spring controlling said tension adjustment, the modification is controlled by the position, along a threaded portion of the first shaft, of a nut, said position is controlled by the rotation degree of the first shaft, whereas the locking of the back in one of any position of the back is controlled by the angular position of a rotative cam upon a portion of the back, the angular position of the rotative cam being controlled by the degree of rotation of the second shift; the last control being preferably transmitted through a linkage system.

In other words, in this preferred modification of the office chair of the present invention, the chair comprises a multi-functional satellite in which:

1. Upon a first shaft is axially movable an organ, the axial position of the multi-functional member controlling the pull action of a cable controlling the opening and the closing of the system of height adjustment of the seat above its pedestal;
2. Upon a threaded portion of the first shaft is axially movable a nut, the axial position of said nut, resulting from the angular rotation of the first shaft, controlling the tension of at least one helical spring acting upon the back, to adjust the tilt tension of the back; and
3. Around the first shaft being rotatively mounted a second shaft, the angular movement of which controls a locking member fixing the angular position of the back, in one of any preselected positions, for example, one vertical position or one reclined position.

It is understood that the above description refers to a preferred example of modification of the present invention, and that many other modifications will be apparent to the one skilled in the art, the object of the invention being to group into one unique location, preferably laterally along the seat, easy to reach by the user's hand when seated, of all adjustment controls of all functions designed to adapt the seat to the user's comfort. It should be noted additionally that, in addition to the functions cited above, the same seat can be arranged and designed to fulfill further functions as it is, for example, described in French Patent No. 2,642,945, in which a differential tilt of the back upon the seat, a tilt of the seat together with the back, the individual tilt of the slop of the seat, the adjustment of the curve of the back, the adjustment of the seat depth, and all other mechanisms are under the user's control.

DESCRIPTION OF PREFERRED EMBODIMENT

Figure 1:
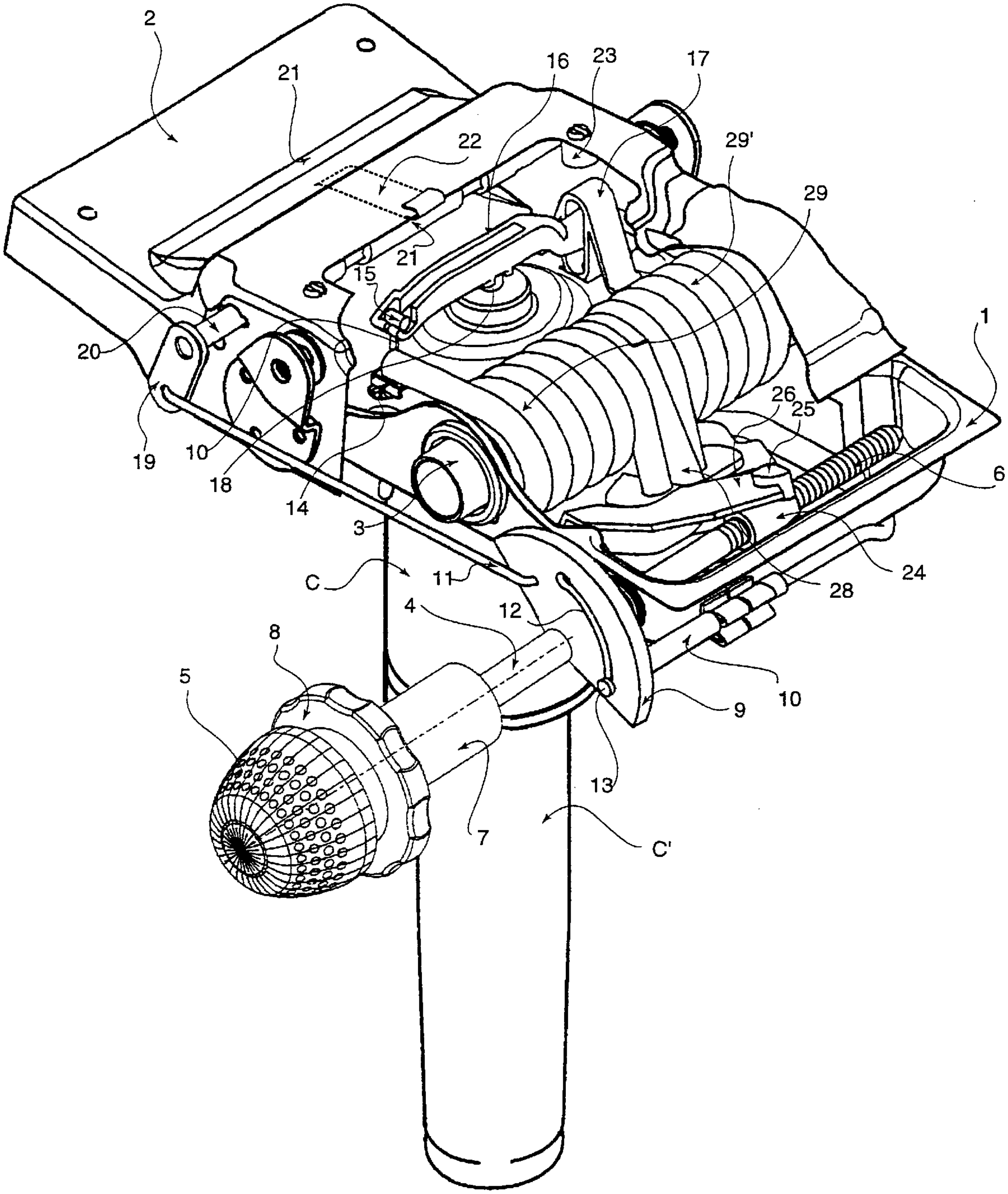
FIG. 1 is a perspective view from the top of the assembly of mechanisms of adjustment and control of an office chair grouped within a satellite according to the present invention, a part of the elements forming the chair, i.e. the seat and the back being omitted and the movable portion of the casing of said mechanism being partially torn for clarity purposes.

This drawing illustrating one modification of the satellite of the present invention, the same numeral references show the same elements upon all figures.

On this drawing, reference 1 shows the bottom part of a casing which encloses all the various mechanisms for the adjustment and the control of an office chair which is mounted upon the upper portion C of a pedestal, the upper portion C being pivotably and axially mounted upon a fixed portion C' of said pedestal, not shown, since quite usual.

The upper part 2 of the same casing is mounted in an also usual manner tilting with respect to part 1 around an axis 3.

The bottom part 1 is connected to the seat (not shown), and the upper part 2 is connected to the back (not shown) of the chair.

In this preferred modification, the chair comprises three possibilities of adjustment, which are individually known, for example:

1. The adjustment of the chair, i.e. of the height of the integral assembly upper portion C of the pedestal/fixed portion or seat 1, with respect to the assembly pedestal and lower columin portion C';
2. The adjustment of the angular tilting of the back, i.e. a control of the locking, in one of at least two extreme or preselected intermediate positions, of the tilting part 2 with respect to the fixed portion 1; and
3. The adjustment of the tilting, tension, i.e. the elastic opposition or strength that the user should overcome to recline the back by leaning rearward, and which constitutes the forward return strength of the back when the user leans forward.

Usually, as explained here above, those three adjustments are controlled by three levers or knobs distributed under the seat, acting individually and independently each upon one of the mechanisms.

Figure 3:
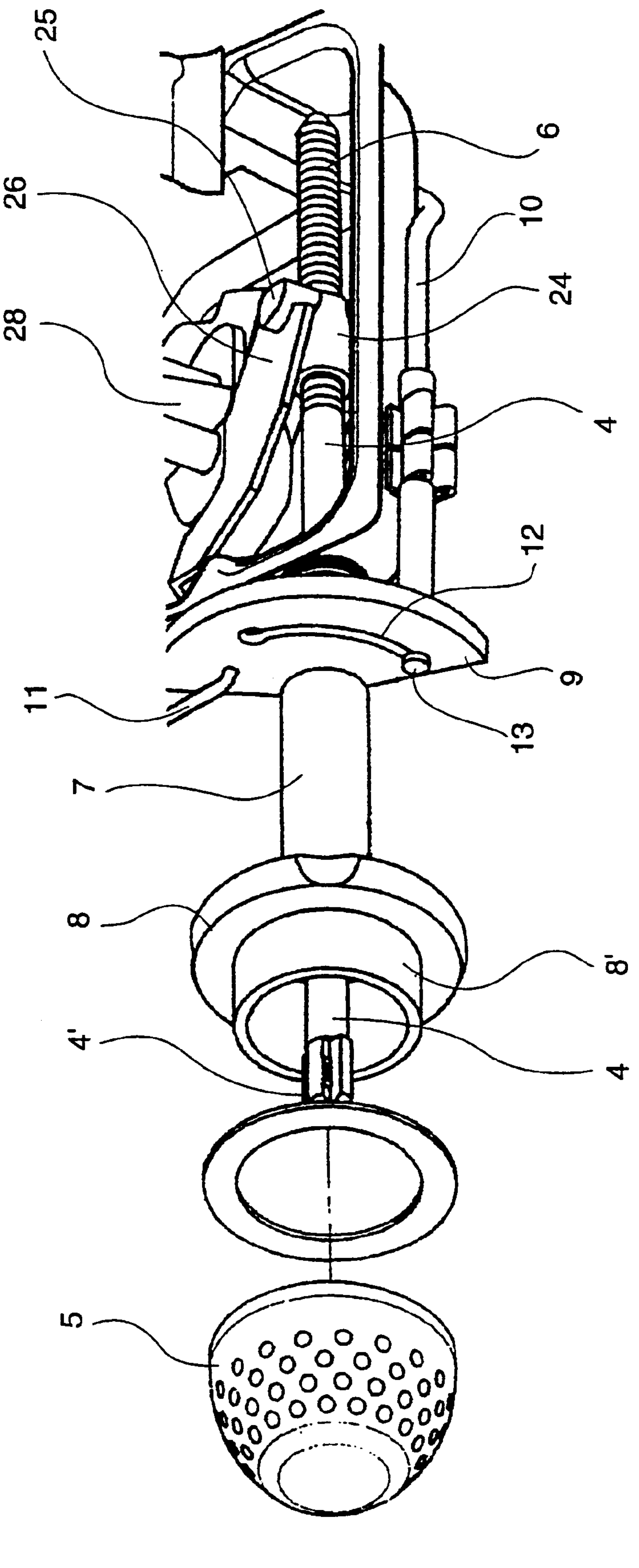
FIG. 3 is an exploded view of the arrangement of the control elements of the satellite.

According to the present invention, all the adjustments are controlled through one unique satellite, as shown more clearly on FIG. 3. As illustrated, the satellite comprises:

1. A first shaft 4 notched at its external end 4' to form a double slot to engage within a corresponding housing of cross section (not shown) of a control knob 5, and threaded at its internal end along a portion 6; and
2. A second shaft 7 mounted coaxially around the first shaft 4, axially and angularly movable, and having at its external end a control crown 8 spaced from knob 5 by a cylindrical ring 8', and at its internal end a sector 9 designed, as explained hereafter so that it can drive in its axial movement a cable 10, and in its angular movement a connecting rod 11.

All adjustments and controls mentioned here above are obtained separately and independently by simple using properly the knob 5 and the crown 8 as described hereafter.

Firstly, the height adjustment of the seat is controlled by moving axially crown 8, to pull axially the sector 9 to take it closer to knob 5. In the sector 9 is cut away a circular slot 12, through which is passed a cable having at its end a bead or enlargement 13 which keep the cable engaged through said slot 12. Due to this arrangement, pulling the cable 10 by moving axially the sector 9 toward the knob 5 is possible whatever the angular position of the sector 9, which permits the second function of crown 8 to be independently rotated.

The cable 10, from its end 13, through the sector 9, makes its way under the fixed part 1 of the casing. It passes through a hole 14 (FIG. 2) to grip at its opposed end, for example by another bead 15, to an end of a lever 16 (FIG. 1). The lever 16 tilts elastically upon a pivot 17 so that it normally keeps closed a valve 18 controlling the cartridge of compressed air. The valve 18 is connected to the telescopically engaging portion C and C' and the pedestal, and is operable to adjust the height of the seat as explained here above.

It is well understood that the elastic pivot 17 keeps normally the valve 18 in the closed position, so that, when not in use, the closed system is locking the seat at any preselected height, while exerting a return strength upon the cable 10. By pulling axially the crown 8, the cable 10 acts upon the lever 16, which opens the valve 18, connecting the two cylinders C and C', which allows the seat to be adjusted to any preselected height. Stopping the axial action upon crown 8 controls the cable 10 to return to its non-action upon the lever 16, which leaves the valve 18 to close said connection, locking the height of the seat in said new preselected height.

Figure 2:
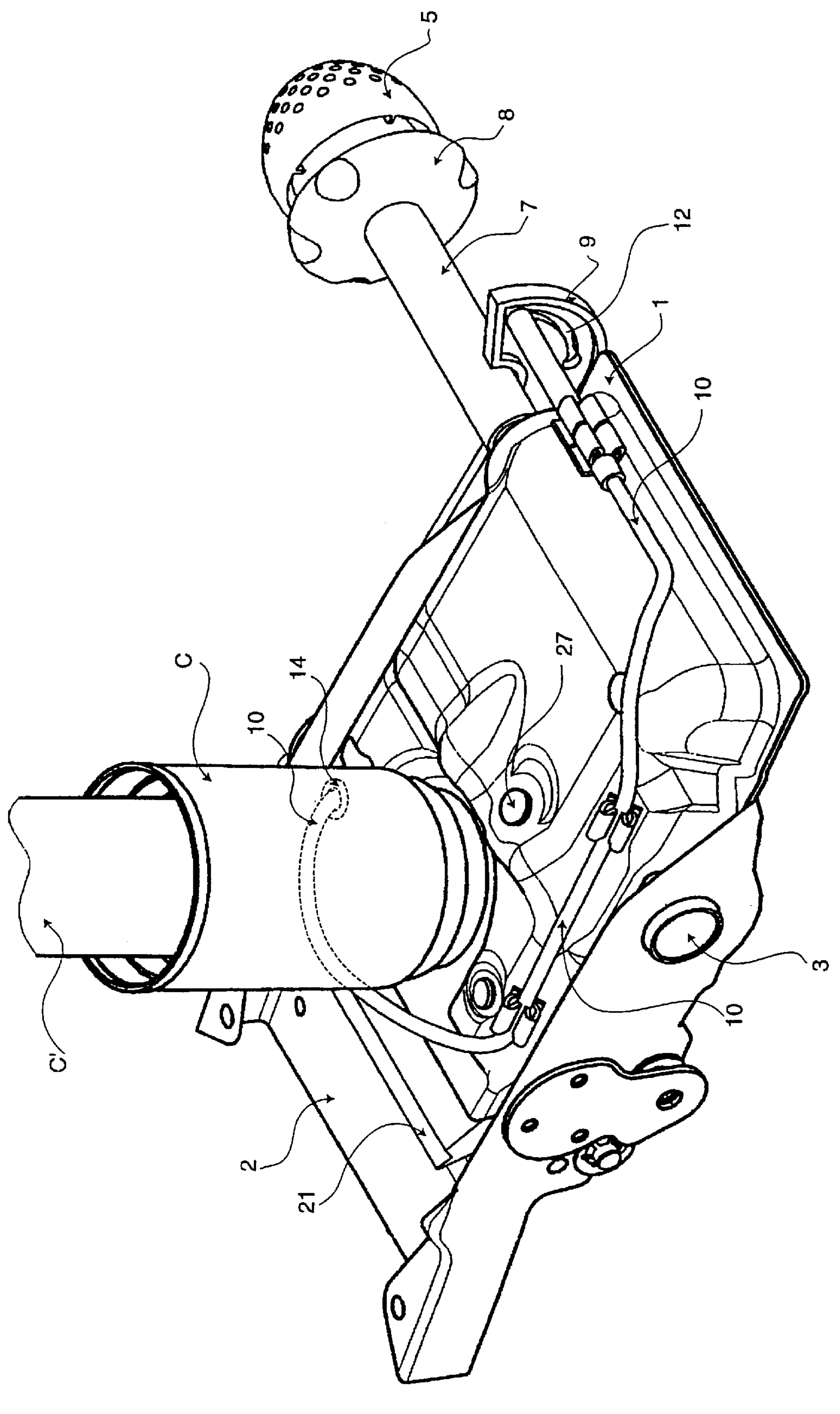
FIG. 2 is a perspective view from the bottom of the same assembly.

Secondly, the reclined position of the back is adjusted by acting upon the same crown 8, but totally with respect to the shaft 4. In this case, the connecting rod 11, fixed at one end to the sector 9 is fixed at its opposed end to a lever 19 (FIG. 1). Lever 19 is rotatively connected to an axis 20 upon which are fixedly mounted cams 21 made of plastic (FIG. 2). The cam 21, in at least one position, locks by friction the surface of the movable upper part 2 of the casing (which is connected to the back, as already explained). In this case, the back is therefore locked in its reclined position. When the axis 20 is rotated, by rotating action upon the crown 8, the cams 21 are no longer engaging the surface of the movable upper part 2, so that the back is freed to be reclined at will. This action is smoothened for example by a flexible blade 22 which engages the cams 21. Flexible stops 23 prevent then from an excessive movement of the freed back.

Such a reclining adjustment can be designed under a number of modifications, such as for example locking the back in foremost position, in multi-position, limited or any further function connected to the incline. The invention is intended to cover the control of all modifications, including the modification illustrated by FIG. 5 and described hereunder.

The use of crown 8 allows therefore the control of two functions of the chair. The knob 5 allows in addition the control of a third function, i.e. the adjustment of the tilting tension of the back.

Figure 4A:
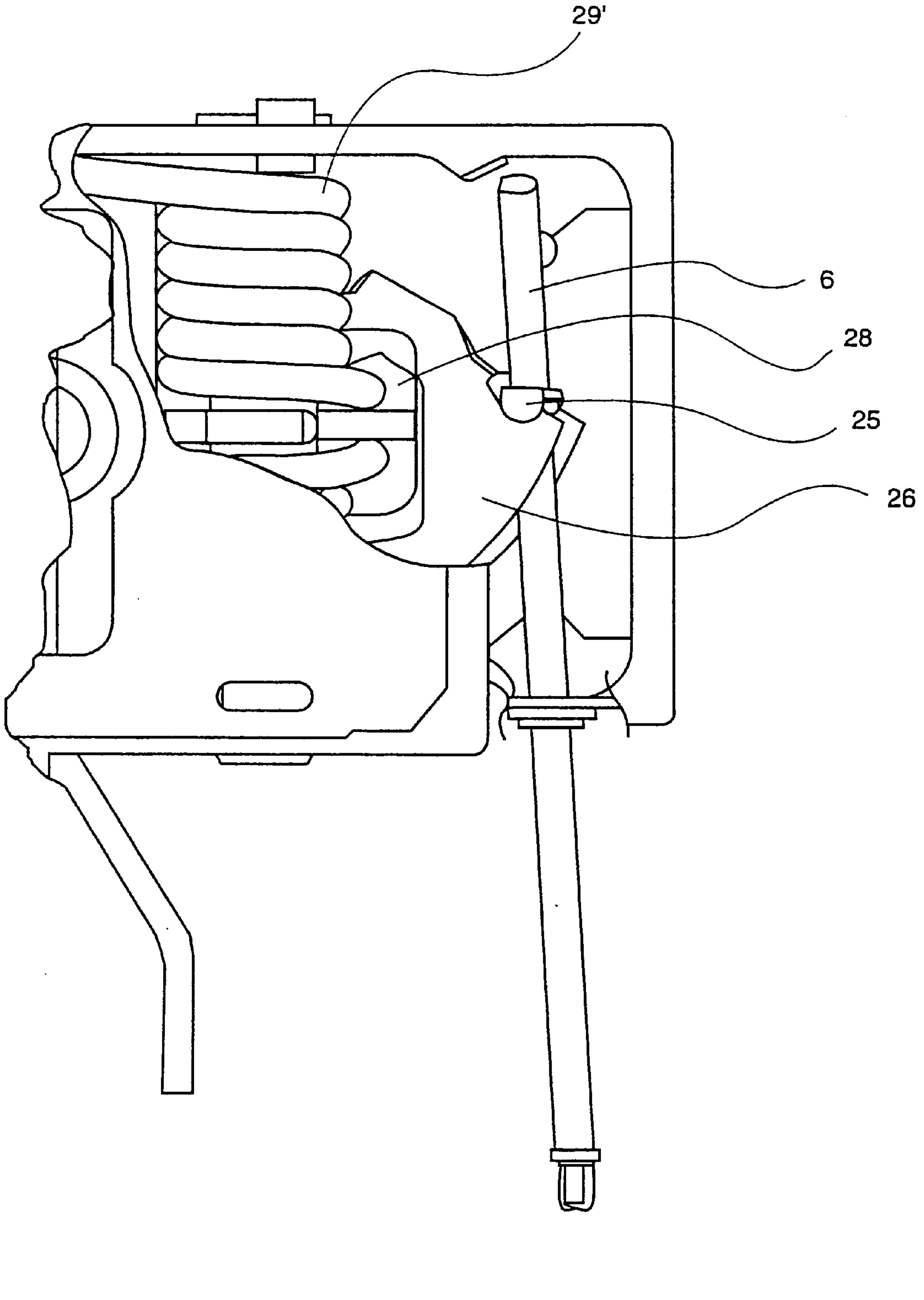
FIGS. 4*a* and 4*b* are partial top views showing more clearly some elements of the mechanism of adjustment of the tilt tension.
Figure 4B:
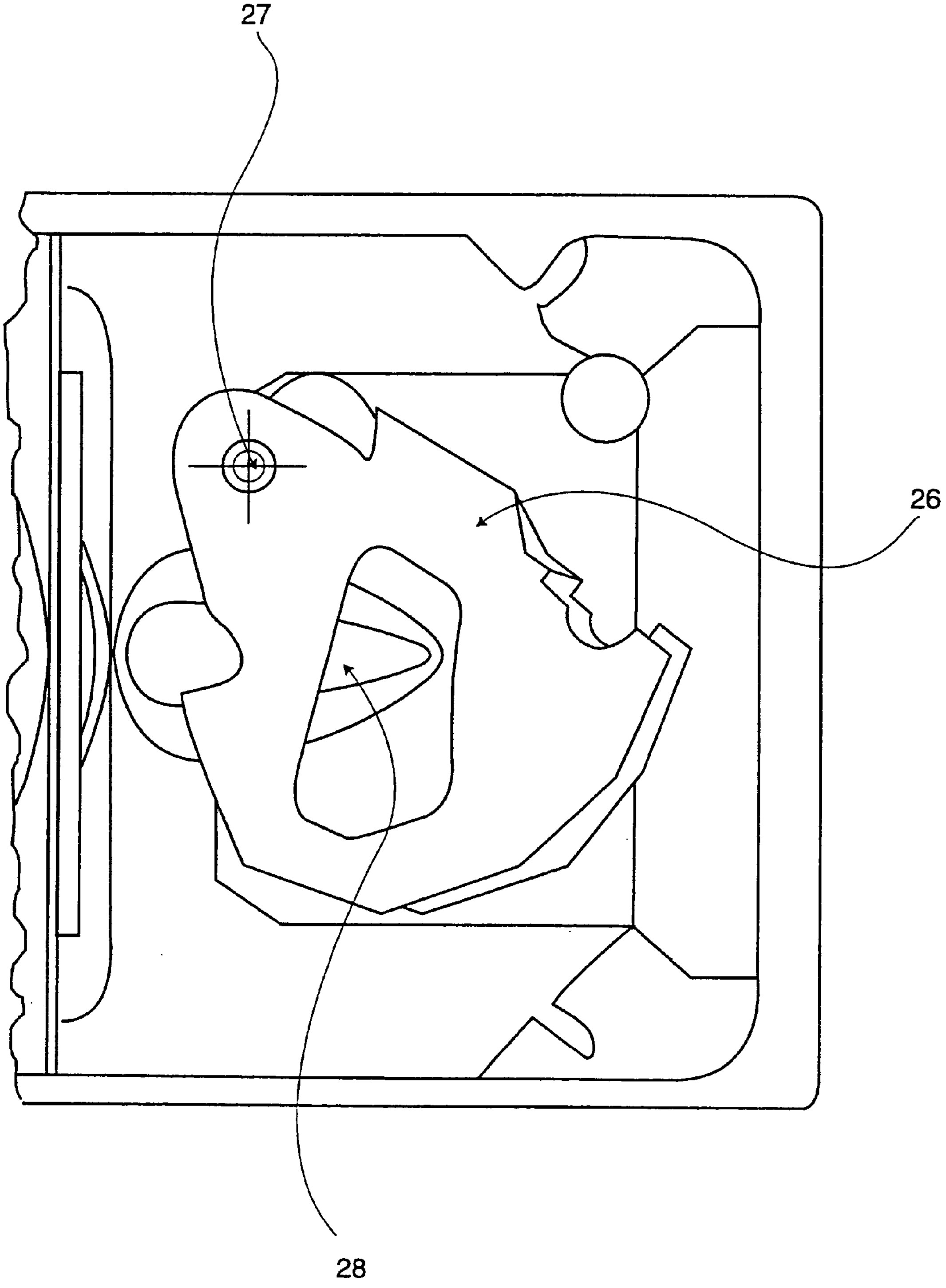

To this effect, the shaft 4, which can rotate freely inside the shaft 7, extends into the casing part 1 in which it ends by a threaded portion 6. Upon said threaded portion 6 is screwed a nut 24 (FIGS. 1 and 4*a*) which through a pin 25 drives an arm 26 pivotally mounted upon a slant axis 27 (FIG. 4*b*). The arm 26 engages a plate 28 to which are fixed both ends of a couple of coiled springs 29, 29' which are wound around the axis 3 around which the part 2 of the casing (which is connected to the back) is tilting.

By rotating the axially fixed threaded portion 6, the nut 24 which is, rotatively fixed, moves axially in one direction to the other, driving through the pin 25 the arm 26 pivoting around the slant axis 27. Due to this obliqueness, the plate 28 takes a swinging movement pressing correspondingly more or less upon the ends of the springs 29, 29', which modifies correspondingly the torque of springs 29, 29' and therefore the tilting tension, which corresponds to the effort requested by the user to recline the back.

The closeness of knob 5 and crown 8 allows therefore to control substantially simultaneously the adjustment of all the functions of the back.

It is to be noted that the axial movement of the crown 8 does not interfere with its angular movement, the plays between the various movable elements allowing the functioning of the rod 11, even when and if it is slightly oblique due to the translation of the shaft 7.

Figure 5:
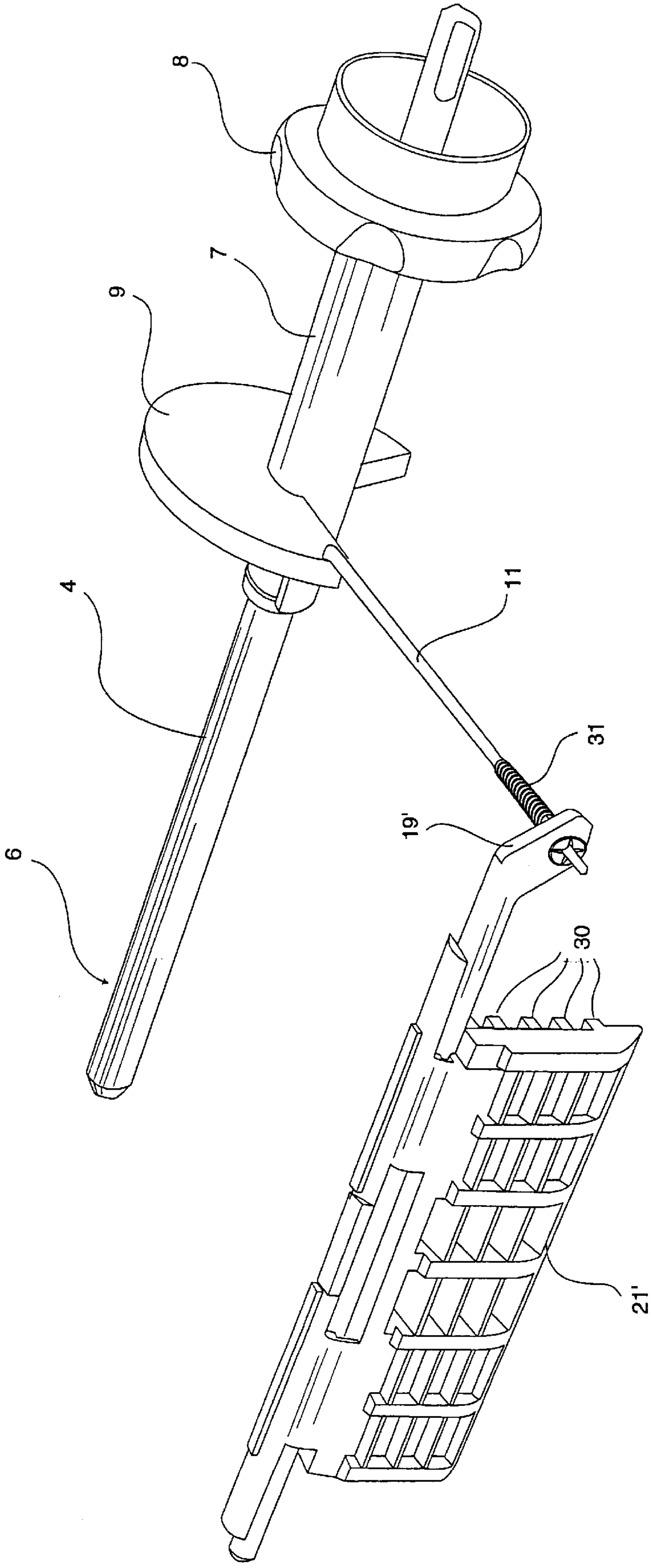
FIG. 5 shows a modification of the locking mechanism of the back in various positions.

FIG. 5 illustrates a modification of the mechanism providing a locking of the tilting angle of the back. The crown 8, the shaft 7, the sector 9 and the connecting rod 11 are the same as previously described, but the lever 19' moves in a perpendicular plan by difference with lever 19, to allow a better transmission of the movement of the connecting rod to an element 21'. The element has the same purpose as element 21, but offers not only two locking positions, but four, due to four ribs 30 which can be used each at will depending upon the rotation angle of crown 8. In a known manner, a spring 31 makes easier the change of rib of the element 21', when it rotates.

As already mentioned, the above description is given as an illustrative and not limitative example of modification of the invention and many further modifications can be designed in the scope of the invention. For example, the satellite is shown here laterally along the seat. It could be placed in any further place for any practical and/or aesthetic reasons.

The satellite contains the controls of the three specific adjustments. It could also contain a different number of adjustments which could be different according to the user's needs. The invention is therefore limited only by the following claims.

The embodiments of the invention in which an exclusive property or privilege is claimed are defined as follows:

1. A chair control for a chair having movable parts, and a reclineable back, the chair control comprising:

a control housing; and a multi-functional member operably supported on the control housing, the multi-functional member including a first control member constructed to translate for controlling a first one of the movable parts, and constructed to rotate for controlling a second one of the movable parts, the first control member including a rotatable sector having an arcuate slot, and including a cable adapted for connection to the first one of the movable parts, the cable including a retained end slidably engaging the arcuate slot so that the retained end slides in the arcuate slot when the first control member is rotated, and translates when the first control member is translated.

2. The chair control defined in claim 1 including a second control member located proximate the first control member, the second control member being constructed to control a third one of the movable parts.

3. A chair control for a chair having movable parts, and a reclineable back, comprising:

a control housing; and a multi-functional member operably supported on the control housing, the multi-functional member including a first control member constructed to translate for controlling a first one of the movable parts, and constructed to rotate for controlling a second one of the movable parts, and a second control member located proximate the first control member, the second control member being constructed to control a third one of the movable parts, the first and second control members including first and second spindles, respectively, the second spindle being rotatably mounted in the first spindle.

4. The chair control defined in claim 3 including a back support defining an axis of tilting during recline, at least one torsion spring located generally along the axis of tilting, and a nut operably engaging the torsion spring for adjusting the tension of the spring; said second spindle including a screw thread for engaging the nut, so that by rotating said second spindle, tension of the torsion spring is adjusted.

5. The chair control defined in claim 4 including a cable for actuating a pneumatic system having a valve, said valve being controlled by pulling of the cable, the pulling of the cable resulting from axial translational movement of the first spindle of said multi-functional member.

6. The chair control defined in claim 1 including a cable for actuating a pneumatic system having a valve, said valve being controlled by pulling of the cable, the pulling of the cable resulting from an axial translational movement of the first control member of said multi-functional member.

7. The chair control defined in claim 3 including a back support pivoted to the control housing, a rotary cam, and a linkage operably connecting the cam to the first spindle for rotating the cam upon rotation of the second spindle, the cam being constructed to engage a portion of the back support to selectively immobilize the back support.

8. A chair control for a chair having movable parts, and a reclineable back, comprising:

a control housing;

a multi-functional member operably supported on the control housing, the multi-functional member including a first control member constructed to translate for controlling a first one of the movable parts, and constructed to rotate for controlling a second one of the movable parts; and a back support pivoted to the control housing and defining an axis of tilting during recline, at least one torsion spring operably mounted in the control housing for biasing the back support about the axis of tilting, and a nut operably engaging the torsion spring for adjusting a tension of the spring; said multi-functional member including a second control member including a spindle with screw threads for engaging the nut, so that by rotating said spindle, tension of the torsion spring is adjusted.

9. A chair comprising:

a seat;

a reclineable back;

a control housing;

at least one of the seat, the reclineable back, and the control housing having movable parts, and a cable attached to a first one of the movable parts; and a multi-functional member operably supported on the control housing, the multi-functional member including a first control member constructed to translate for controlling the first one of the movable parts, and constructed to rotate for controlling a second one of the movable parts, the first control member including a rotatable sector having an arcuate slot, and the cable including a retained end slidably engaging the arcuate slot so that the retained end slides in the arcuate slot and does not activate the first one of the movable parts when the first control member is rotated, but translates and does activate the first one of the movable parts when the first control member is translated.

10. The chair defined in claim 9 including a second control member located proximate the first control member, the second control member being constructed to control a third one of the movable parts.

11. The chair defined in claim 9 including a pneumatic system including a valve for providing vertical adjustment of the chair, and a cable for actuating a pneumatic system having a valve, said valve being controlled by pulling of the cable, the pulling of the cable resulting from an axial translational movement of the first control member of said multi-functional member.

12. A chair comprising:

a seat;

a reclineable back;

a control housing;

at least one of the seat, the reclineable back, and the control housing having movable parts;

a multi-functional member operably supported on the control housing, the multi-functional member including a first control member constructed to translate for controlling a first one of the movable parts, and constructed to rotate for controlling a second one of the movable parts; and a second control member located proximate the first control member, the second control member being constructed to control a third one of the movable parts, the first and second control members including first and second spindles, respectively, the second spindle being rotatably mounted in the first spindle.

13. The chair defined in claim 12 including a back support defining an axis of tilting during recline of the back, at least one torsion spring located generally along the axis of tilting, and a nut operably engaging the torsion spring for adjusting the tension of the spring; said second spindle including a screw thread for engaging the nut, so that by rotating said second spindle, tension of the torsion spring is adjusted.

14. The chair defined in claim 13 including a pneumatic system including a valve for providing vertical adjustment of the chair, and a cable for actuating the valve, said valve being controlled by pulling of the cable, the pulling of the cable resulting from axial translational movement of the first spindle of said multi-functional member.

15. A chair comprising:

a seat;

a reclineable back;

a control housing;

at least one of the seat, the reclineable back, and the control housing having movable parts;

a multi-functional member operably supported on the control housing, the multi-functional member including a first control member constructed to translate for controlling a first one of the movable parts, and constructed to rotate for controlling a second one of the movable parts; and a back support pivoted to the control housing and supporting the reclineable back, a rotary cam, and a linkage operably connecting the cam to the multi-functional member for rotating the cam upon operation of the multi-functional member, the cam being constructed to engage a portion of the back support to selectively immobilize the back support.

16. A chair comprising:

a seat;

a base including a housing;

a pneumatic system having a valve actuateable to adjust a height of the seat with respect to the base, and having a cable operably connected to the valve;

a reclineable back pivoted to the housing;

a cam for blocking the degree of tilt of one of the back and the seat;

a spring for supporting the reclineable back;

a multi-function member operably mounted to the housing including a first spindle translatable for pulling the cable to open and close the valve for adjusting the height of the seat with respect to the base and rotatable for operating the cam to at least partially immobilize the back, and including a second spindle including a threaded portion engaging a nut operably connected to the spring and movable axially under the effect of the rotation of said second spindle for adjusting tension of the spring.

* * * * *

UNITED STATES PATENT AND TRADEMARK OFFICE

CERTIFICATE OF CORRECTION

PATENT NO. : 5,915,788

DATED : June 29, 1999

INVENTOR(S) : Jean-Marc Schneider

It is certified that error appears in the above-identified patent and that said Letters Patent is hereby corrected as shown below:

Column 4, line 19;
"columin" should be --column--.

Column 7, claim 6, line 9;
Delete "1" and insert --3--.

Signed and Sealed this

Twenty-first Day of December, 1999

Attest:

Q. TODD DICKINSON

*Attesting Officer*

*Acting Commissioner of Patents and Trademarks*